United States Patent [19]

Lake

[11] 4,062,112

[45] Dec. 13, 1977

[54] EXPLOSIVELY OPERATED WIRE CUTTER

[76] Inventor: Hilton J. Lake, 785 W. 51st Place, Hialeah, Fla. 33012

[21] Appl. No.: 769,442

[22] Filed: Feb. 17, 1977

[51] Int. Cl.² ........................ B26B 15/00; B26D 5/12
[52] U.S. Cl. .................................................. 30/228
[58] Field of Search ................... 30/180, 228, 277; 83/639; 114/221 A

[56] References Cited

U.S. PATENT DOCUMENTS

| 2,454,528 | 11/1948 | Temple | 30/228 X |
|---|---|---|---|
| 2,766,525 | 10/1956 | Hoffman | 30/228 |
| 3,003,235 | 10/1961 | Temple | 30/180 |
| 3,320,669 | 5/1967 | Chandler | 30/228 |
| 3,419,960 | 1/1969 | Hanson | 30/180 |
| 3,482,484 | 12/1969 | Brizzolara | 30/180 X |
| 3,885,484 | 5/1975 | Sturgis | 83/639 X |
| 3,895,552 | 7/1975 | Lagofun | 83/639 X |

Primary Examiner—Jimmy C. Peters
Attorney, Agent, or Firm—Oltman and Flynn

[57] ABSTRACT

The present wire cutting device, intended for cutting bomb wires, has a barrel with a wire-receiving slot which is open at one side of the barrel. A blunt-faced dielectric piston in the barrel is explosively actuated to sever from the wire the complete length of the wire segment extending across the barrel at its wire-receiving slot. The explosion gases escape through the slot behind the piston and blow the severed ends of the wire away from the barrel and away from each other. Different explosive attachments are provided for detachable connection to the barrel to provide a manually-initiated percussive charge or a time fuse-initiated charge or an electrically-initiated charge.

11 Claims, 10 Drawing Figures

U.S. Patent  Dec. 13, 1977  Sheet 1 of 2  4,062,112
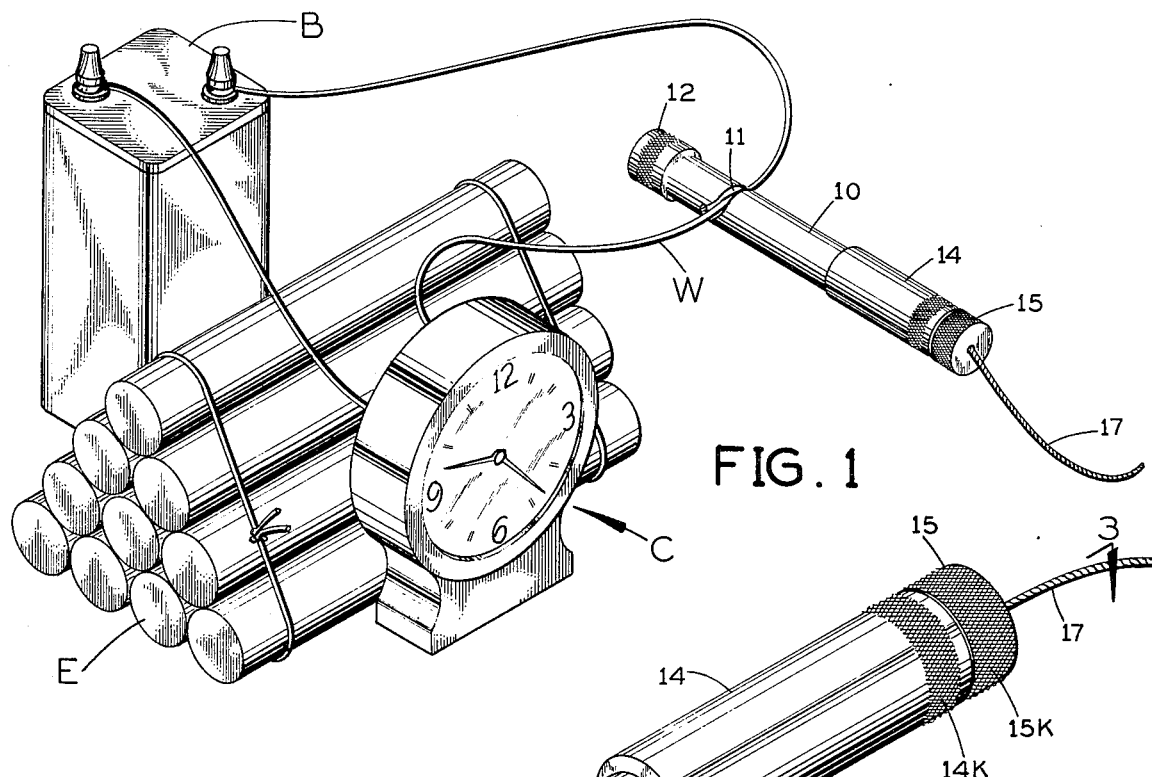
FIG. 1
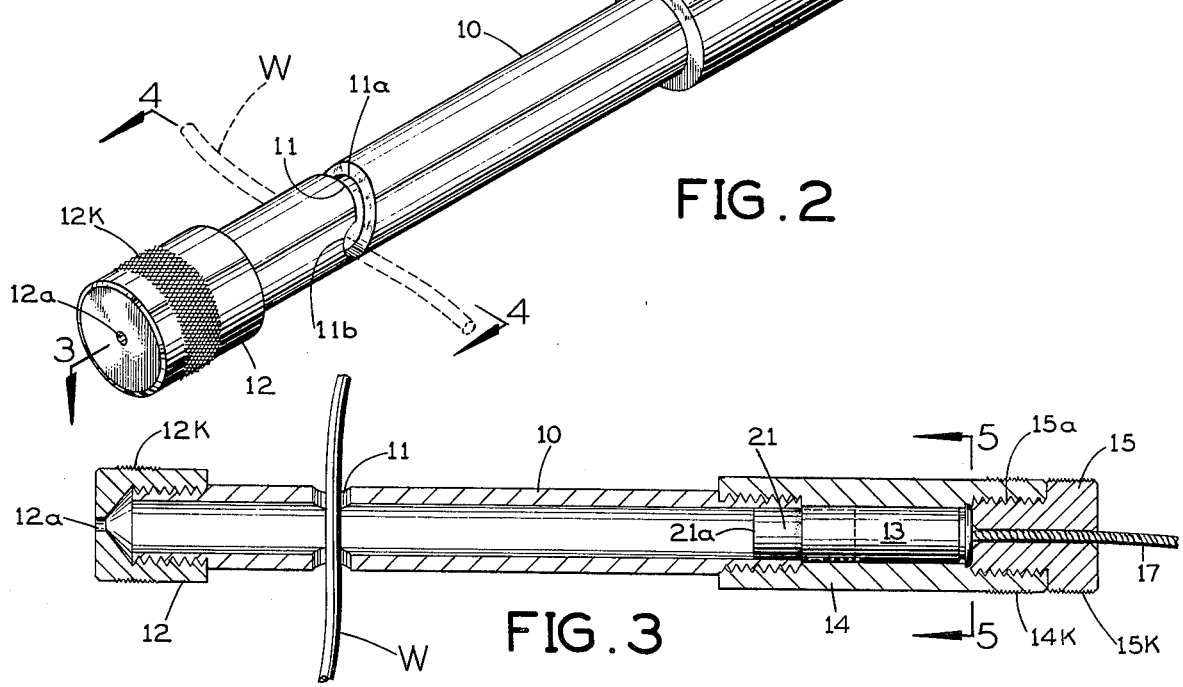
FIG. 2
FIG. 3
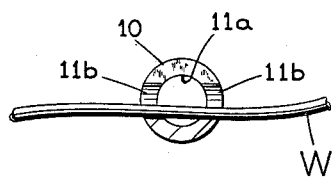
FIG. 4
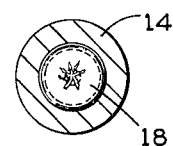
FIG. 5

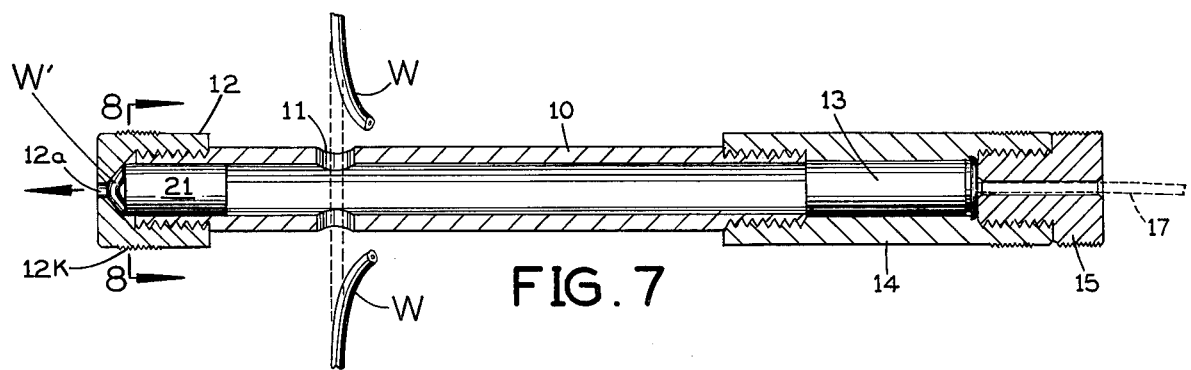
FIG. 7
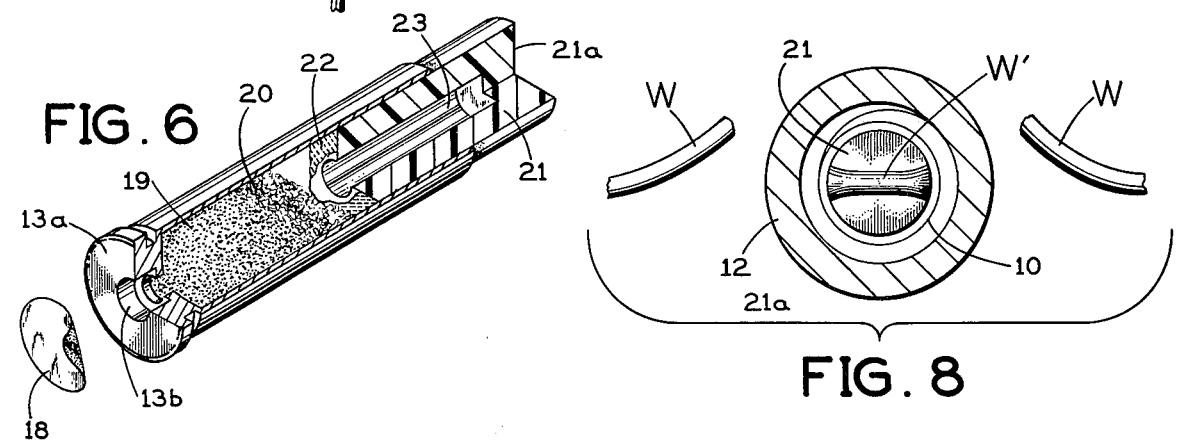
FIG. 6
FIG. 8
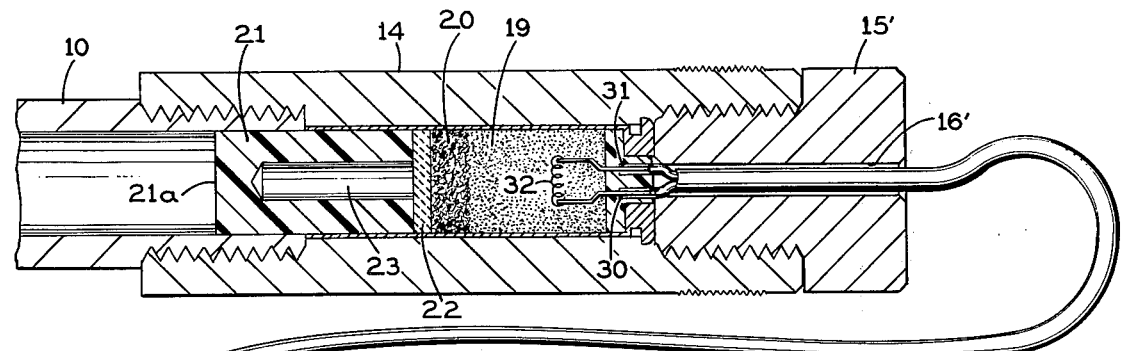
FIG. 9
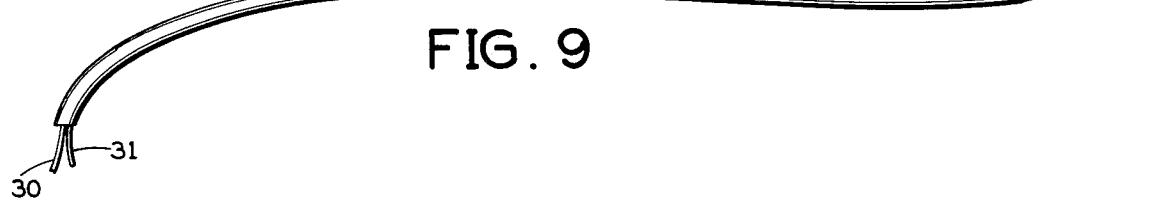
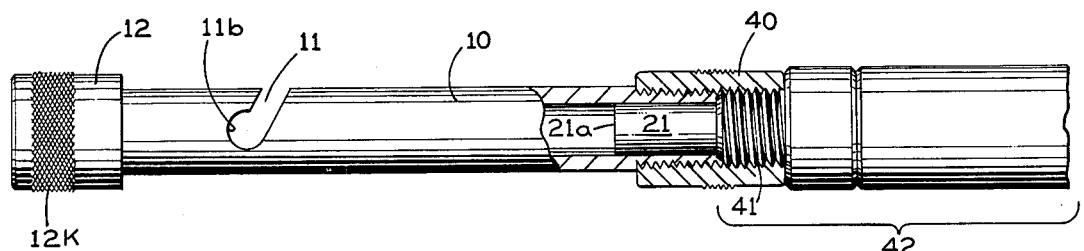
FIG. 10

EXPLOSIVELY OPERATED WIRE CUTTER

BACKGROUND OF THE INVENTION

Various explosively actuated cutting devices have been proposed heretofore for cutting cables, lines, wires and the like. Examples of such prior devices are disclosed in the following U.S. Pat. Nos. Matthews 2,687,572; Smyres 2,716,813; Gross 2,742,697; Temple 2,806,442; Bohl et al 2,924,147; Wilterdink et al 3,175,289; Temple et al 3,246,396; Parnell 3,393,605; and Giebel et al 3,886,842.

None of these prior devices was specifically intended for bomb disposal purposes by law enforcement authorities, who frequently are presented with emergencies in which a bomb, or what is apparently a bomb, must be disabled or blown up under safe conditions. In many such emergencies the indicated procedure is to sever an electrical wire, or pair of wires, on the bomb.

In the above-cited patents to Mattnews, Smyres, Parnell, Wilterdink at al, Temple et al, and Giebel et al, the piston has a straight wire-cutting edge extending transverse to the cable, line or wire to be cut. Consequently, after being severed, the cut ends of this cable, line or wire might be relatively close to each other, which could be disastrous if the wire being cut were part of the electrical wiring for a bomb and the severed wire ends touch each other or touch the casing of the wire cutter.

This is also true of the Temple patent, which has a cutting punch with a conical tip for severing the line.

In the Bohl et al patent the piston has a circular knife edge at its periphery. This is also true of the Gross patent, in which this cutting edge of the piston cooperates with a fixed sleeve inside the barrel which provides a female cutting die element. In both of these patents, therefore, the entire length of the wire segment which extends across the bore of the barrel is severed from the remainder of the wire. However, neither of these patents has provision for venting the explosion gases in such a manner that they blow the severed ends away from the cutting device to positively prevent the inadvertent closing of an electrical circuit through the wire or the like which has just been cut.

SUMMARY OF THE INVENTION

The present invention is directed to an explosively actuated wire cutter for bomb disposal purposes in which the wire or wires to be severed must be assumed to be part of a dangerous electrical circuit.

The present invention provides a wire-cutting piston of suitable dielectric material with a blunt front face that severs from the wire the entire length of wire segment which extends across the bore of the barrel in which the piston is slidable. The wire to be cut is received in a slot in the barrel which is open at one side of the barrel to permit the wire cutter to be quickly and easily applied to the wire from one side. The cutting piston moves past this slot as it cuts the segment out of the wire. The explosion gases behind the piston are vented to the atmosphere through this slot, and in doing so they blow the severed ends of the wire away from the cutting device and away from each other. Consequently, there can be no danger of inadvertently completing an electrical circuit through the wire which has just been cut.

In accordance with an advantageous feature of this invention, various different types of explosive devices can be attached to the barrel to provide different modes of explosively actuating the wire-cutting piston. Preferably, three different modes can be used: manually initiated percussion charge; time fuse initiated charge; and electrically initiated charge.

The principal object of this invention is to provide a novel and improved explosively actuated wire cutter which is specifically designed for use by law enforcement, bomb disposal officers to cut bomb wires.

Another object of this invention is to provide a novel wire cutter which reliably eliminates any danger of completing an inadvertent electrical circuit through the wire after it has been cut.

Further objects and advantages of this invention will be apparent from the following detailed description of a certain presently-preferred embodiment thereof, which are shown in the accompanying drawings in which FIG. 1 is a perspective view of the present wire cutter applied to an electrical wire in a bomb;

FIG. 2 is an enlarged perspective view of the present wire cutter (with the wire shown in phantom);

FIG. 3 is a longitudinal section through the wire cutter taken along the line 3—3 in FIG. 2 and showing the parts before the wire cutter is explosively actuated;

FIG. 4 is a cross-section taken along the line 4—4 in FIG. 2 and showing the wire in full lines;

FIG. 5 is a cross-section taken along the line 5—5 in FIG. 3;

FIG. 6 is an enlarged perspective view, with parts broken away for clarity, showing the cartridge and piston subassembly in the apparatus of FIGS. 1-5;

FIG. 7 is a view similar to FIG. 3 and showing the position of the parts after the wire cutter has been explosively actuated;

FIG. 8 is a cross-section taken along the line 8—8 in FIG. 7;

FIG. 9 is a fragmentary longitudinal section showing an electrically operated explosive firing device in the present apparatus in accordance with a second embodiment of this invention; and FIG. 10 is an elevational view, with parts broken away for clarity, showing the present apparatus with a military-type firing device.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring to FIGS. 2-4, the present wire cutter comprises an elongated cylindrical barrel 10, preferably of steel, which is externally screw-threaded at each end. In the presently-preferred embodiment this barrel is 4.5 inches (11.4 cm.) long and has a bore diameter of 0.380 inch (0.965 cm.) for receiving a standard "plastic practice" 38 caliber projectile.

Near its left end in FIG. 1 the barrel is formed with a wire receiving slot 11 which extends through the wall of the barrel over slightly more than 180° circumferentially around the barrel. On either side of its circumferential midpoint 11a the slot is inclined toward the near end of the barrel. This slot terminates at its opposite ends in forwardly-offset, diametrically opposed, rounded recesses 11b located at opposite sides of the barrel. In one practical embodiment this slot has a width of ⅛ inch (0.32 cm.) for slidably receiving wires of a size from #30 down to #12 stranded. This slot enables the barrel to be applied to a wire, or a pair of wires, from one side of the latter, with the slot passing slidably over the wire until the wire is received in the offset inner ends 11b of the slot.

A first internally screw-threaded end cap 12 of brass or other suitable rigid material is threaded onto the end of the barrel 10 which is nearer the slot 11. This end cap has a small vent opening 12a.

In this embodiment of the invention, the apparatus has a time-fuse initiated firing device at the opposite end of the barrel 10 from the end cap 12. This firing device includes a black powder 38-caliber cartridge 13, which is slidably received in a tubular cartridge holder 14. This cartridge holder is internally screw-threaded at its inner end for threaded engagement with the back end of the barrel 10. The cartridge holder is similarly threaded at its back end for threadedly receiving an end cap 15, which has a reduced, externally screw-threaded stem 15a which is threaded into this end of the cartridge holder. The end cap 15 has a central bore 16 which snugly receives one end of a conventional fuse 17.

The two end caps 12 and 15 and the cartridge holder 14 are knurled on the outside, as shown at 12k, 15k and 14k, respectively, to facilitate their attachment and removal.

As best seen in FIG. 6, the cartridge 13 is cylindrical for most of its length and it has an integral transverse wall 13a at its back end which has a central opening 13b leading into the interior of the cartridge. This opening is normally closed by a thin flexible strip 18 with a self-adhesive layer on its inner face for applying it adhesively to the cartridge end wall 13a. Just beyond its end wall 13a the cartridge holds a black powder charge 19, and a paper wad 20 with a moisture-proof sealant is located just beyond this charge. As best seen in FIG. 7 the open front end of the cartridge 13 abuts against the back end of the barrel 10 when the cartridge holder is threaded onto this end of the barrel.

A cylindrical piston 21 has its back end snugly received in the open front end of the cartridge 13, as best seen in FIG. 6, and before being fired this piston has its front end slidably received in the back end of the barrel 10, as best seen in FIG. 3. After its insertion in the cartridge, the piston is sealed to the cartridge by molten wax which solidifies to provide a frangible seal, as shown at 22 in FIG. 6. The piston is formed with a central recess 23 which is open at its back end.

In accordance with the present invention, the piston 21 is of suitable dielectric material, such a Nylon, and it has a blunt front face 21a which has no cutting edge except at the cylindrical periphery of the piston. Preferably, this front face 21a extends perpendicular to the bore of the barrel 10, as shown.

In the assembly of this apparatus, after the piston 21 has been inserted in the cartridge 13 and wax-sealed to it, the cartridge is inserted into the cartridge holder 14 from the latter's inner end. The seal strip 18 on the back end of the cartrdige is punctured and then the end cap 15 containing the end of the fuse 17 is screwed into the back end of the cartridge holder. Next, the cartridge holder is threaded onto the back end of the barrel 10 to provide the completed assembly shown in FIG. 3.

The barrel 10 may be applied from one side to an electrical wire W of the bomb as shown in FIG. 1. Typically such a bomb may have several sticks of explosive E, a time clock C, a battery B, and suitable electrical wiring (including the wire W), for causing the bottom to explode at a predetermined time, all as shown schematically in FIG. 1. As shown in FIG. 2, the barrel 10 accepts the wire W, which is received in the forwardly offset recesses 11b at the inner end of the slot 11 in the barrel.

As shown in FIG. 3, before the apparatus is fired the piston 21 is to the right of the bomb wire W seated in the slot 11. When the cartridge is fired, the explosive force breaks the wax seal and the piston is driven to the left, toward the wire W. When the piston is so actuated it severs from the wire W the complete 0.380 inch long wire segment which extends across the bore of the barrel between the diametrically opposite, forwardly offset recesses 11b at the inner ends of the slot 11. As shown in FIG. 7, the piston drives this severed wire segment W' against the inside of the end cap 12 on the barrel.

As shown in FIG. 7, the piston 21 moves completely past the wire-receiving slot 11 so that immediately after the wire is severed the explosion gases behind the piston are vented to the atmosphere through this slot, blowing the severed ends of the wire away from the barrel 10 and away from each other. Consequently, there is no danger of inadvertently closing an electrical circuit through the severed wire as a result of its severed ends contacting each other or the barrel 10 of the wire cutter.

Because of the nature of the piston's cutting action, in which it severs a 0.380 inch long segment from the wire, the dielectric nature of the piston itself, and the venting of the explosion gases through the slot 11 to blow apart the severed wire ends, any electrical circuit through the wire being cut is reliably and permanently broken.

In place of the time fuse 17, the wire cutter may be fired electrically by an arrangement of the type shown in FIG. 9. A pair of insulation-sheathed electrical conductors 30, 31 extend through the central opening 16' in a modified end cap 15' and their inner ends are connected across an exposed, resistance wire 32 which is embedded in the explosive powder 19 in the cartridge 13. The conductors 30, 31 extend from the wire cutter to a battery and a switch (not shown) at a remote location. When this switch is closed the battery is connected across wire 32 through the conductors 30, 31, and the current through wire 32 causes the powder 19 to deflagrate, actuating the piston 21 to cut the bomb wire in the manner already described.

FIG. 10 shows still another modification in which a military "M-1" percussive firing device is connected to the back end of the barrel to explosively actuate the piston.

An internally screw-threaded, externally knurled, rigid coupling sleeve 40 is threaded onto the back end of the barrel 10 and it threadedly receives the stem 41 of the military "M-1" firing device 42. This firing device contains the explosive charge, which is mechanicaly triggered in a known fashion. Before attaching this firing device to the barrel, the wire-cutting piston 21 would be slidably inserted into the right end of the barrel 10 in FIG. 10, so that the end of the threaded stem 41 of the firing device will be in close proximity to the back end of this piston when the firing device is attached to the barrel.

From the foregoing description, taken in conjunction with the accompanying drawings, it will be understood that the present apparatus may be readily applied to a bomb wire without disturbing it. The officer firing the explosive charge in the apparatus will be at a safe distance from the bomb. When the apparatus is fired the explosion gases are promptly vented to the atmosphere, making it safe for the officer to pick up the apparatus immediately afterwards. As already explained, the dielectric piston severs a wire segment from the remainder of the wire and then the severed ends of the wire are blown away from the wire cutter, so that the apparatus is ideally suited for breaking a dangerous electrical circuit from a safe distance. Except for the piston and the cartridge or other explosive device, the apparatus is reusable over and over again. The used piston and cartridge or other explosive device are replaced each time the apparatus is to be fired again.

It should be understood that in the embodiment shown in FIG. 3 the time fuse 17 may be either a blasting fuse or a cannon (firecracker) fuse. Since these two different types of fuses are of different diameters, two different types of the end cap 15 would be provided each with a bore size corresponding to the size of the particular type of fuse which it accommodates.

I claim:

1. In an explosively operated wire cutter having:
 a tubular barrel with at transverse wire-receiving slot which extends continuously over more than half the transverse peripheral extent of the barrel, whereby to enable the barrel to be applied transversely to the wire to position a segment of the wire extending transversely across the inside of the barrel;
 and means for positioning an explosive charge in operative relationship to the barrel at one axial side of said slot;
 the improvement which comprises:
 a piston of dielectric material closely received slidably in said barrel for explosive actuation by the explosive charge past the slot from a starting position at said one axial side of the slot adjacent the explosive charge, said piston having a blunt, wire-engaging front face away from the explosive charge which extends transverse to the axis of the barrel for substantially the complete interior cross-section of the barrel, whereby to completely sever said segment from the remainder of the wire on either side of the barrel and blow the severed ends of the wire away from the barrel on either side by venting from the barrel the explosion gases behind the piston out through said slot when the piston is explosively actuated axially past the slot.

2. A wire cutter according to claim 1, wherein said barrel has a cylindrical bore, and said piston is substantially cylindrical and has a substantially flat front face extending perpendicular to the axis of the barrel.

3. A wire cutter according to claim 2, wherein said slot on each side of its midpoint transversely around the periphery of the barrel is inclined forwardly away from the explosive charge and terminates at its opposite ends in diametrically opposed, wire-receiving recesses which are offset forwardly.

4. A wire cutter according to claim 2, wherein said means for positioning an explosive charge in operative relationship to the barrel comprises a plurality of different interchangeable firing devices for attachment to one end of the barrel.

5. A wire cutter according to claim 2, wherein said means for positioning an explosive charge in operative relationship to the barrel comprises:
 a cartridge holding said explosive charge; and
 a tubular cartridge holder removably mounted on one end of the barrel and holding said cartridge abutting against said end of the barrel.

6. A wire cutter according to claim 5, wherein said cartridge holder is threadedly mounted on said end of the barrel.

7. A wire cutter according to claim 6, and further comprising:
 an end cap threadedly mounted on the end of the cartridge holder away from the barrel; and
 a fuse extending through said end cap to the cartridge.

8. A wire cutter according to claim 7, wherein said fuse is a time fuse.

9. A wire cutter according to claim 6, and further comprising electrically-operated means for firing said cartridge.

10. A wire cutter according to claim 4, wherein said means for positioning an explosive charge in operative relationship to the barrel comprises:
 a military-type percussive firing device; and
 a coupling sleeve holding said firing device next to one end of the barrel.

11. A wire cutter according to claim 10, wherein said coupling sleeve is internally screw-threaded and threadedly engages said end of the barrel and said firing device.

* * * * *